Figure 1:
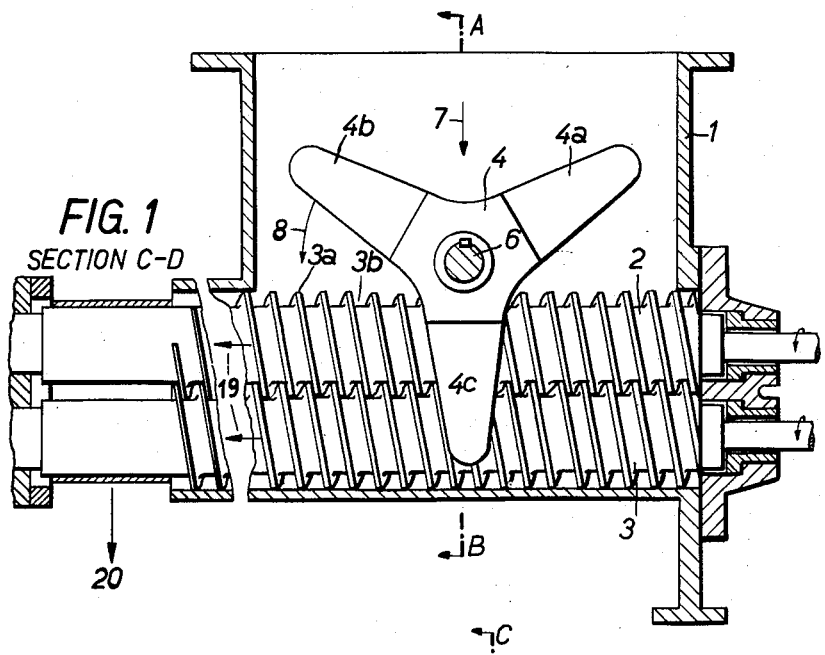

Feb. 26, 1957 R. ERDMENGER 2,782,963
MEANS FOR FEEDING TO MACHINES STICKY OR
CRUST-FORMING MATERIALS
Filed July 21, 1954 2 Sheets-Sheet 1

SECTION C-D

SECTION A-B

INVENTOR.
RUDOLF ERDMENGER
BY *Burgess and Dinklage*
ATTORNEYS

SECTION G-H

SECTION E-F

INVENTOR.
RUDOLF ERDMENGER
BY Burgess and Dinklage
ATTORNEYS

United States Patent Office 2,782,963
Patented Feb. 26, 1957

2,782,963

MEANS FOR FEEDING TO MACHINES STICKY OR CRUST-FORMING MATERIALS

Rudolf Erdmenger, Bergisch-Gladbach, Germany, assignor to Farbenfabriken Bayer Aktiengesellschaft, Leverkusen, Germany, a corporation of Germany Application July 21, 1954, Serial No. 444,841

Claims priority, application Germany July 27, 1953

3 Claims. (Cl. 222—227)

The present invention relates to means for feeding to machines of all kinds materials which are sticky or are likely to form crusts and is particularly, but not exclusively applicable to feeding means arranged in the charging hoppers of machines adapted for instance for mixing and kneading, pulverizing or separating sticky or crust-forming materials.

The charging of, for example, pasty, wet, granular or fibrous materials into machines such as extruders, driers, atomizers or spray apparatus, is handicapped by the tendency of the material to stick to the walls of the charging hopper and to obstruct the flow of material by the formation of bridges. Hitherto, this action has been resisted by heating on the walls of the hopper, or by causing the walls to vibrate by means of vibrators operated electromagnetically or pneumatically, or with the aid of scrapers, doctor blades or auxiliary screw conveyors. The efficiency of these known means of resisting obstruction is often unsatisfactory and varies according to whether they are arranged in the upper section or in the lower section of the charging hopper. In the case of kneading machines for laboratory purposes, the feeding of materials can be facilitated by manually pressing the material with a spatula or other suitable tool into the threads of screw conveyors. Constructions having one or more auxiliary screw conveyors have been provided in charging hoppers of apparatus for large scale operation. It has been shown that the use of auxiliary devices of this kind leads to difficulties in feeding material, or they are required to have a speed of revolution properly related to the speed of operation of the machine being charged in order to avoid undesired squeezing, i. e. compression, of the materials in the charging hopper. Furthermore, some of these auxiliary devices are complicated and difficult to clean.

In accordance with the present invention, the obstructive or braking action in the feeding of material can be overcome by a feeding means comprising a single-blade or multiple-blade agitator which is rotatable about an axis transverse to the direction of feed of the material. The agitator can have knife-like blades which are so arranged that they deliver or push the material under pressure on to the carrying or conveying mechanism of the machine being charged.

Figure 2:
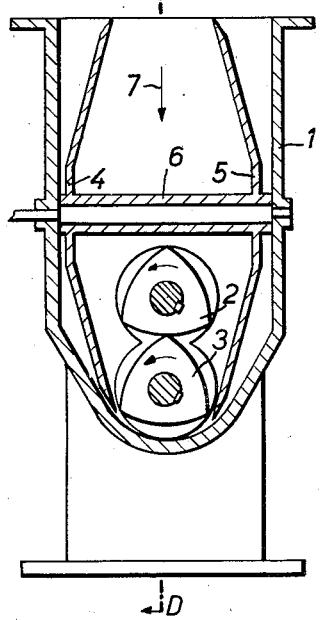
Figure 3:
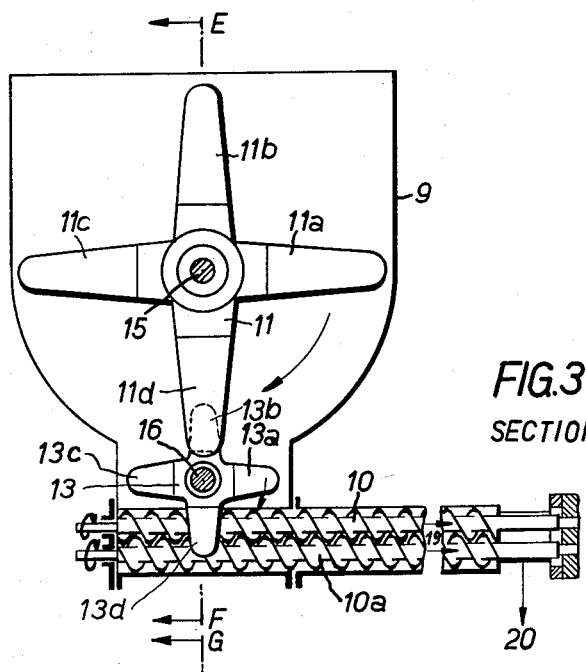
Figure 4:
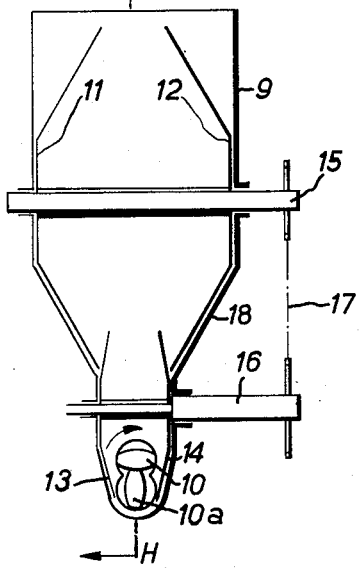

The application of the feeding means provided by the invention to charging hoppers for the purpose of securing continuous and non-obstructed flow of material is illustrated by way of example in the accompanying diagrammatic drawings in which:

Figure 1 is a longitudinal section through the feeding side of a screw conveyor provided with a three-blade agitator, Figure 2 is a sectional view of Figure 1 taken on the line A—B, Figure 3 is a longitudinal section of a charging hopper provided with two co-operating four-blade feeding agitator, and, Figure 4 is a sectional view taken on the line E—F of Figure 3.

As shown in Figure 1 a charging hopper 1 has two screw conveyors 2 and 3 which are both rotatable in the same direction. The agitator with the blades 4 and 5 is pivoted as feeding means in the charging hopper. The blades 4 and 5 are arranged to rotate about a common axis 6 transverse to the direction 7 of feed of the material. The blades 4 and 5 are positioned symmetrically at a small distance from the walls of the hopper 1. The blades 4 and 5 have three arms 4a, 4b and 4c. These arms are inwardly bent. The screws 2 and 3 are positioned at the lower part of the hopper 1. When seen in the direction in which the material is conveyed by the screws (indicated by arrows 19), the blade 4 is on the right-hand side of the screws and the blade 5 on the left-hand side. The operation of the agitators is such that the material delivered into the hopper (indicated by arrow 7) is engaged by the blades or impellers of the agitators and, while the arms of the blades or impellers touch and glide over the lands 3a of the screw conveyor 3, is pushed by them in the direction of the arrow 8 into the conveyor threads 3b of the screws. The material is discharged in the direction indicated by arrow 20. The blades or impellers operate in a similar way to a trowel. The larger part of material sticking to each blade is immediately removed by the screws and a very small portion remains adhering to the blade, but is, however, scraped off on the following rotation of the blade. The material conveyed by the screws 2 and 3 is discharged as indicated by arrow 20.

The feeding means according to the invention is distinguished by its great simplicity and by the fact that the speed of rotation of its agitators is entirely independent of the speed of rotation of the rotatable parts of the machine (not shown in the drawing) with which the hopper is associated. The speed of rotation of the agitators need not be changed if, for instance, the rate at which material is advanced by the screws is diminished. The knife-like construction of the blades prevents any undue strain on the material resulting from compression or jamming. Practical experiments carried out with wet sands or wet ferrous sulfate have shown that the quantity of material conveyed by the feeding means illustrated in Figures 1 and 2 is up to three times the quantity that is conveyed without it, because the conveying threads of the screw are supplied with material more uniformly and at an essentially higher rate. The safe operation of the feeding means has also been proved in experiments using fibrous materials such as glass wadding.

The device shown in Figures 3 and 4 is adapted to remove sticky or non-flowing material from a container and comprises a hopper 9 at the lower part of which are screw conveyors 10 and 10a. Two agitators of different dimensions are pivoted in the hopper 9. The axes of the agitators are arranged in the center line of the hopper 9 parallel to each other and transversely to the axis of the screw conveyors 10 and 10a. The larger agitator is positioned above the smaller agitator. Each of the agitators has at least two blades which are positioned symmetrically to each other and rotate about a common axis. Two pairs of blades 11 and 12, and 13 and 14 respectively are associated with the screws. The two pairs of blades are respectively mounted on axes 15 and 16 which are driven by a common chain 17. Each blade has four arms (see Figure 3), for instance blade 11 has the arms 11a, 11b, 11c and 11d. The arms of the blades are bent inwardly (see Figure 4) so that the blades 11 and 12 of the larger agitator pass close to the inner surface of a conical part 18 of the charging hopper 9 and also close to the blades 14 and 15 of the smaller agitator.

The larger pair of blades serves to brake and loosen the material adhering to the walls of the hopper 9 and to convey this material to the blades 13 and 14 of the smaller agitator which passes it into the threads of the screws 10 and 10a. (The arms 13a, 13b, 13c and 13d of the blade 13 are shown in Figure 3.) This arrangement ensures that the material is discharged from the hopper 9 at a uniform rate, engaged by the screws 10 and 10a, which cooperate with one another, and is conveyed in the direction indicated by arrows 19 (Figure 3) and discharged in the direction indicated by arrow 20 (Figure 3).

I claim:

1. Feeding means adapted to convey sticky and crust-forming materials and arranged in charging hoppers of machines of all kinds comprising a charging hopper and at least one screw conveyor arranged at the lower part of said charging hopper, an agitator pivoted in said charging hopper so that the axis of said agitator is positioned transversely to the axis of said screw conveyors, drive means for rotating said screw conveyor, separate drive means for rotating said agitator independently of said screw conveyor said agitator having at least two blades rotating about said axis common to said blades, said blades being positioned symmetrically to each other substantially near the walls of said charging hopper, each of said blades having at least one upwardly bent arm with the inside surfaces of said arm of said blades positioned for touching and gliding over the lands of said conveyor screws thereby feeding the material to be conveyed into the threading of said conveyor screws.

2. Feeding means adapted to convey sticky and crust-forming material and arranged in charging hoppers of machines of all kinds comprising a charging hopper and at least one screw conveyor arranged at the lower part of said charging hopper, two agitators of different dimensions being pivoted in said charging hopper, the axes of said agitators being arranged transverse to the axis of said screw conveyors, the agitator of larger dimensions being positioned above the agitator of smaller dimensions, drive means for rotating said screw conveyor, separate drive means for rotating said agitators independently of said screw conveyor, said agitator of larger dimensions having at least two blades rotating about the axis common to said blades, said blades being positioned symmetrically to each other, said agitator of smaller dimensions having at least two blades rotating about the axis common to said blades, said blades being positioned symmetrically to each other, said blades of said agitators of different dimensions having arms being bent inwardly with the inside surfaces of said arms of said blades of said agitator of larger dimensions positioned for passing along the outside surfaces of said arms of said blades of said agitator of smaller dimensions at the instant said arms of said blades of said agitator of larger dimensions are directed downwardly and vertically to the axis of said agitator of smaller dimensions and said arms of said blades of said agitator of smaller dimensions are directed upwardly and vertically to the axis of said agitator of larger dimensions with the inside surfaces of said arms of said blades of said agitator of smaller dimensions positioned for touching and gliding over the lands of said conveyor screws thereby feeding the material to be conveyed into the threading of said conveyor screws.

3. Feeding means in accordance with claim 2, in which the axes of said agitators are arranged one above the other in a plane transverse to the axis of the screw conveyor, and in which the drive means for rotating said agitators is a single drive means common to both agitators.

References Cited in the file of this patent

UNITED STATES PATENTS

| | | |
|---|---|---|
| 854,165 | Hodge | May 21, 1907 |
| 1,280,103 | Gregory | Sept. 24, 1918 |
| 1,605,502 | Blue | Nov. 2, 1926 |
| 1,859,290 | Davis | May 24, 1932 |
| 2,616,592 | Boughman | Nov. 4, 1952 |